Feb. 14, 1956  B. I. HOLZ  2,734,769
INSECT REPELLENT AND DISINFECTANT DEVICE
Filed Sept. 16, 1952
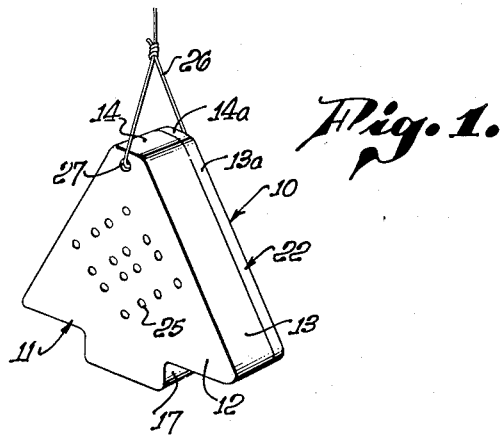
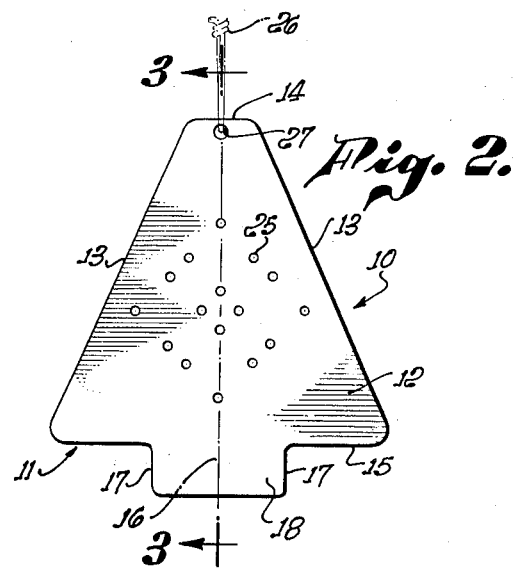
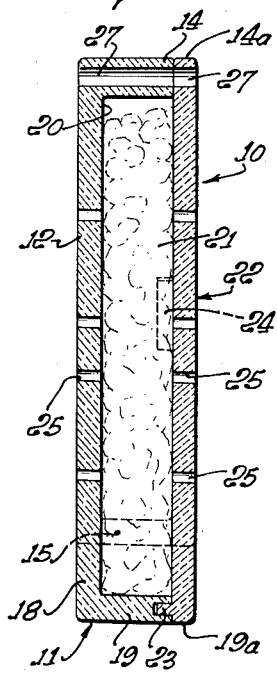
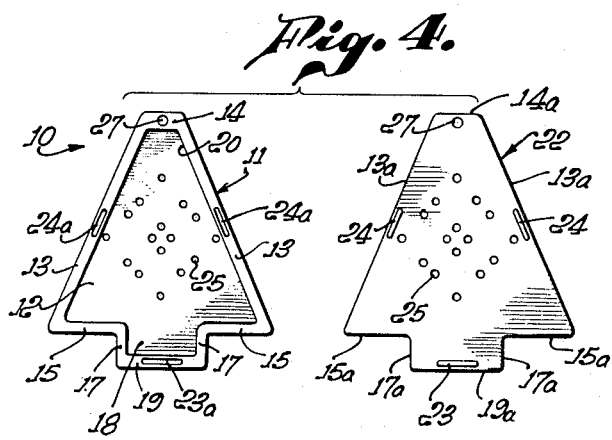
BERTRAM I. HOLZ,
INVENTOR.
BY
Bernard Kriegel
ATTORNEY.

United States Patent Office 2,734,769
Patented Feb. 14, 1956

2,734,769

INSECT REPELLENT AND DISINFECTANT DEVICE

Bertram I. Holz, Beverly Hills, Calif., assignor to Household Mfg. Co., Los Angeles, Calif., a corporation of California Application September 16, 1952, Serial No. 309,888

3 Claims. (Cl. 299—24)

The present invention relates to devices for repelling insects, and for disinfecting particular regions in which the devices are placed.

An object of the present invention is to provide an improved and comparatively simple and inexpensive device embodying an insect repellent, disinfectant or deodorant.

Another object of the invention is to provide an insect repellent and disinfecting device, in which inadvertent loss of the repellent and disinfecting material is greatly minimized, if not eliminated completely.

A further object of the invention is to provide an insect repellent and disinfectant device that can be supported readily on a suitable surface, such as on a table top or shelf, and which may be suspended in a convenient location, as within a closet.

Yet another object of the invention is to provide an insect repellent and disinfecting device that has a pleasing appearance. In a preferred form, it is made to simulate a tree, such as a cedar tree.

This invention possesses many other advantages, and has other objects which may be made more clearly apparent from a consideration of a form in which it may be embodied. This form is shown in the drawings accompanying and forming part of the present specification. It will now be described in detail, for the purpose of illustrating the general principles of the invention; but it is to be understood that such detailed description is not to be taken in a limiting sense, since the scope of the invention is best defined by the appended claims.

Referring to the drawings:

Figure 1 is an isometric projection of a device embodying the invention;

Fig. 2 is a front elevational view of the device disclosed in Fig. 1;

Fig. 3 is a vertical section, on an enlarged scale, taken along the line 3—3 on Fig. 2;

Fig. 4 is an exploded view disclosing the component parts of the container portion of the device.

As disclosed in the drawings, the device includes a container 10 for an insect repellent, a deodorant, or a disinfectant. The container itself includes a box-like portion 11 that is made to simulate a tree. This box-like portion has a vertical main end wall 12, from which project tapered side walls 13 that converge upwardly, merging into a comparatively narrow top wall 14. At their lower ends, the tapered side walls 13 merge into lower walls 15 disposed substantially at right angles to a vertical central plane 16 extending through the device, these lower walls in turn, merging into the parallel sides 17 of the trunk portion 18 of the device. These sides 17, in turn, are made integral with the bottom portion 19 of the trunk.

The top wall 14, side walls 13, lower walls 15, trunk walls 17 and bottom wall 19 all extend in the same direction from the main end wall 12, to form a box-like chamber or cavity 20 in which the insect repellent, deodorant or disinfectant 21 is to be contained. This disinfectant is disposed in the box-like portion of the device in any suitable form. As an example, it may be in granulated, pellet, cake or flake form. After it has been disposed within the chamber 20 of the container, it is permanently retained therein by placing a flat cover or closure member 22 over the container chamber and against its various wall portions 14, 13, 15, 17, 19 that extend from the main end wall 12. This cover 22, although in flat form, conforms in shape to the shape of the main end wall 12 and to the configuration provided by the various walls projecting from the end wall. Thus, the cover has a narrow top edge 14a in alignment with the top wall 14, as well as tapered side edges 13a conforming to the tapered walls 13 of the container portion of the device. These side edges 13a merge into lower edges 15a conforming to the lower walls 15 of the box portion 11 of the device, and these lower edges merge into parallel side edges 17a and a bottom edge 19a, both of which conform to the parallel side walls 17 and bottom 19 of the trunk portion 18 of the box.

The cover 22 is properly aligned with respect to the container portion 11 of the device by providing an elongate lug 23 adjacent the bottom edge 19a of the cover, as well as a pair of elongated lugs 24 adjacent the tapered side edges 13a of the cover. These lugs 23, 24 fit within companion elongate recesses 23a, 24a in the bottom wall 19 of the container, as well as in the tapered side walls 13, the parts thereby being appropriately aligned with respect to one another and being coupled to one another. Removal of the cover 22 from the box portion 11 of the device is prevented by a suitable adhesive applied within the elongate recesses 23a, 24a, and on the lugs, plugs or projections 23, 24 on the cover 22 fitting therewithin.

The end wall 12 and the cover 22 are formed with a suitable number and arrangement of perforations or holes 25 allowing air to pass through the contents 21 of the container, so that the substance therewithin is effective within the region where it is located to repel insects, or to serve as a deodorant or disinfectant, depending upon the particular substance 22 that has been placed within the container prior to application of the cover 22. The device may rest upon a table top or shelf, being supported on its bottom portion 19, whereby it will remain erect and in proper position and will also provide a pleasing appearance, in view of its shape to simulate a tree. In the event it is desired to suspend the device, as within a closet, then a suitable cord or string 26 may be inserted through aligned holes 27 through the top wall 14 and the adjacent portion of the cover 22, the string or cord being hung on a suitable hook (not shown), to enable the particular insect repelling deodorizing or disinfecting action to take place.

The device is preferably made of a synthetic resin. As an example, the container portion 11 and the cover 22 may be molded from styrene, with the holes 25 formed therein. The particular substance 21 to be used is placed in the container portion and the projections 23, 24 on the cover may then be softened, as by use of acetone, the cover then being placed in appropriate position on the container. The acetone will soften the projections 23, 24, as well as the sides of the elongate recesses or sockets 23a, 24a in which they are received. Following the softening, the main parts will harden and effectively fuse the cover 22 to the box portion 11 of the device, integrating the two parts and preventing their inadvertent removal. As a result, the contents 21 of the container will be retained therein, and cannot be inadvertently spilled, in the event the device is dropped or falls over.

It is, accordingly, apparent that an insect repellent, disinfectant or deodorant device has been provided that is comparatively simple and inexpensive, being capable of retaining its contents without fear of loss. The device is self-supporting, or it can be suspended from a suitable support. Regardless of its location of use, it simulates a tree, such as a cedar tree, giving it a pleasing appearance and enabling it to be readily placed in a room, or within a drawer or closet.

The inventor claims:

1. A repellent and deodorant device, including a container having a perforated end wall, enclosing walls extending from said end wall around its perimeter, said enclosing walls comprising a flat horizontal bottom wall for supporting the device on a surface, generally parallel side walls extending upwardly from said bottom wall, lower walls extending outwardly in opposite directions from said side walls, tapered walls converging upwardly toward each other from the outer ends of said lower walls, a top wall extending between the upper ends of said tapered walls, a perforated cover conforming to, engaging and secured to said enclosing walls, at least one of said enclosing walls having a recess therein, an axial projection on said cover disposed in said recess to align said cover in its position of conformance with said enclosing walls, and a repelling and deodorizing substance in said container.

2. A repellent and deodorant device, including a container having a perforated end wall, enclosing walls extending from said end wall around its perimeter, said enclosing walls comprising a flat horizontal bottom wall for supporting the device on a surface, generally parallel side walls extending upwardly from said bottom wall, lower walls extending outwardly in opposite directions from said side walls, tapered walls converging upwardly toward each other from the outer ends of said lower walls, a top wall extending between the upper ends of said tapered walls, a perforated cover conforming to, engaging and secured to said enclosing walls, said bottom wall and tapered walls having recesses therein, axial projections on said cover disposed in said recesses to align said cover in its position of conformance with said enclosing walls, and a repelling and deodorizing substance in said container.

3. A repellent and deodorant device, including a container having a perforated end wall, enclosing walls extending from said end wall around its perimeter, said enclosing walls comprising a flat bottom wall for supporting the device on a surface, generally parallel side walls extending upwardly from said bottom wall, lower walls extending outwardly in opposite directions from said side walls, tapered walls converging upwardly toward each other from the outer ends of said lower walls, a top wall extending between the upper ends of said tapered walls, a perforated cover conforming to, engaging and secured to said enclosing walls, said top wall and cover having aligned holes extending therethrough for the reception of a supporting cord, said bottom wall and tapered walls having recesses therein, axial projections on said cover disposed in said recesses to align said cover in its position of conformance with said enclosing walls, and a repelling and deodorizing substance in said container.

References Cited in the file of this patent

UNITED STATES PATENTS

| | | |
|---|---|---|
| 2,351,267 | Irwin | June 13, 1944 |
| 2,581,684 | McKenzie | Jan. 8, 1952 |